(12) United States Patent
Shipman

(10) Patent No.: US 7,032,612 B2
(45) Date of Patent: Apr. 25, 2006

(54) DUAL USE AIR CHUCK

(75) Inventor: Kerry A. Shipman, Homewood, IL (US)

(73) Assignee: G.H. Meiser & CO, Posen, IL (US)

( * ) Notice: Subject to any disclaimer, the term of this patent is extended or adjusted under 35 U.S.C. 154(b) by 341 days.

(21) Appl. No.: 10/459,095

(22) Filed: Jun. 11, 2003

(65) Prior Publication Data

US 2004/0250852 A1    Dec. 16, 2004

(51) Int. Cl.
*F16K 15/20* (2006.01)
(52) U.S. Cl. ........................ 137/231; 137/270
(58) Field of Classification Search ............ 137/223, 137/231, 269, 270; 73/146.3; 76/146.8
See application file for complete search history.

(56) References Cited

U.S. PATENT DOCUMENTS

| | | | |
|---|---|---|---|
| 1,484,342 A * | 2/1924 | Schweinert | 137/231 |
| 1,498,175 A * | 6/1924 | Kraft et al. | 137/269 |
| 3,521,485 A | 7/1970 | Porter | |
| 3,926,205 A * | 12/1975 | Gourlet | 137/223 |
| 5,012,954 A * | 5/1991 | Will | 152/415 |
| 5,033,294 A | 7/1991 | Huang | |
| 5,908,984 A | 6/1999 | Chuang | |
| 6,076,544 A | 6/2000 | Pierce | |
| 6,105,600 A | 8/2000 | Wang | |
| 6,105,601 A | 8/2000 | Wang | |
| 6,146,116 A | 11/2000 | Wu et al. | |
| 6,220,273 B1 | 4/2001 | Wu | |
| 6,260,572 B1 * | 7/2001 | Wu | 137/231 |
| 6,276,391 B1 * | 8/2001 | Wu | 137/223 |
| 6,276,405 B1 | 8/2001 | Wang | |
| 6,279,599 B1 * | 8/2001 | Chen | 137/231 |
| 6,289,920 B1 | 9/2001 | Wang | |
| 6,314,985 B1 * | 11/2001 | van der Blom | 137/231 |
| 6,347,642 B1 | 2/2002 | Schulte | |
| 2004/0055641 A1 * | 3/2004 | Ostrowiecki | 137/223 |

* cited by examiner

*Primary Examiner*—John Rivell
(74) *Attorney, Agent, or Firm*—Marshall, Gerstein & Borun LLP

(57) ABSTRACT

An air chuck that accommodates a Schrader valve, or U.S.-type valve, in a retracted position and further accommodates a Presta valve, or French-type valve, in an extended position. The air chuck has a chuck body that slides relative to a chuck housing. A lock pin extends radially outwardly from the sliding chuck body and travels along an elongated channel in the chuck housing. When the sliding chuck body reaches its extended position, to accommodate a Presta valve, the lock pin exits the elongated channel and is received in an annular channel defined by an inside wall of an end of a cap secured to the chuck housing, and a rim of the chuck housing. A second annular channel communicates with the elongated channel to receive the lock pin when the sliding chuck body is in the retracted position. The annular channels allow the sliding chuck body to be rotated relative to the chuck housing to lock the chuck body in the extended or retracted position.

4 Claims, 4 Drawing Sheets

DUAL USE AIR CHUCK

BACKGROUND

1. Field of the Disclosure

This disclosure relates generally to air chucks for tire pressure gauges inflation devices, and the like, and, more specifically, to a versatile air chuck capable of being easily converted for use with different types of valves.

2. Prior Art

As many bicycle enthusiasts can attest, makers of tire pressure gauges and inflation devices have yet to develop a satisfactory air chuck for a tire gauge that can be quickly and easily converted for use with both Presta valves, also known as French-type valves, and Schrader valves, also known as U.S.-type valves. A Presta valve has a thin, small diameter threaded valve stem, and a core that floats. A small nut is secured to the top of the floating core, and the core extends outwardly of the threaded valve stem. By contrast, a Schrader valve has a relatively large diameter valve stem and an interior, spring loaded valve core. One form of tire pressure gauge that can accommodate both Presta valves and Schrader valves utilizes a T-shaped air chuck, with one side adapted to fit a Presta valve and another side adapted to fit a Schrader valve.

Another version of an air chuck that can be used with both Presta valves and Schrader valves is one that employs multiple parts that are rearranged by the user. These parts include a grommet having a relatively larger hole on one side and a relatively smaller hole on the other side, a reversible pin that can be faced outwardly, toward the grommet, or inwardly, away from the grommet, and an end cap.

In order to use the tire pressure gauge with a Schrader valve, the user unscrews the end cap, removes both the grommet and reversible pin, orients the reversible pin so as to face outward, toward the grommet, orients the grommet so that the relatively large hole faces outward, toward the end cap, and then reassembles the air chuck by securing the end cap to the tire gauge, with both the grommet and reversible pin secured inside.

When it is desired to reconfigure such an air chuck for use with a Presta valve, the user unscrews the end cap, removes both the grommet and reversible pin, orients the reversible pin so as to face inward, away from the grommet, orients the grommet so that the relatively small hole faces outward, toward the end cap, and then reassembles the air chuck by securing the end cap to the tire gauge, with both the grommet and reversible pin secured inside.

The manipulation of small parts necessary to change such an air chuck from accommodating a Presta valve to accommodating a Schrader valve, and vice-versa, proves to be tedious for the user and the small end cap, grommet, and reversible pin are prone to falling on the ground, rendering them easy to lose. When any of these small parts is lost, the device to which the air chuck is connected is incapacitated.

There are several types of air pumps that attempt to accommodate both Presta valves and Schrader valves. Some of these air pumps include mechanisms to facilitate changing from accommodating a Presta valve to accommodating a Schrader valve without having to disassemble the air pump. However, these mechanisms are complex, frequently requiring multiple parts including levers and springs. These mechanisms result in a product that is of a significant size, rendering them undesirable for use in portable devices, which bicyclists prefer to be very compact in size and lightweight.

Thus, it would be desirable for an air chuck to accommodate both Presta valves and Schrader valves, and to easily and readily convert for use with either type of valve without requiring disassembly of the air chuck, and without the need for extensive mechanisms to facilitate such conversion. The manner in which these and other desirable features are achieved is demonstrated in the following Summary, Detailed Description of the Preferred Embodiment, and the drawings.

SUMMARY

An air chuck for use with, by way of example, a tire pressure gauge or an inflation device, for a tire pressure gauge is operable in an extended, locked position for use with a Presta valve, and is further operable in a retracted position for use with a Schrader valve. The air chuck includes a sliding chuck body received in a chuck housing provided on the tire pressure gauge. A grommet is provided within the sliding chuck body, and a chuck pin extends axially through the chuck housing, the grommet, and the sliding chuck body.

A pin projects outwardly from the sliding chuck body, and rides within an elongated channel provided in an inner wall of the chuck housing. A cap secures the entire air chuck assembly to the tire pressure gauge. An annular channel is provided between an inside wall of, or near, the outer end of the cap and the outer rim of the sliding chuck housing, sized so as to receive the pin as it exits the elongated channel in the inner wall of the chuck housing. Thus, the elongated channel in the inner wall of the chuck housing and the annular channel communicate with one another, to the extent that the pin projecting from the sliding chuck body can seamlessly travel from the elongated channel into the annular channel, with the inside wall of the outer end of the cap limiting axial movement of the pin past the cap, thereby limiting axial travel of the sliding air chuck body once it is fully extended so as to accommodate a Presta valve.

When it is desired to use the tire pressure gauge to determine the air pressure of a tire having a Presta valve, the user pulls the sliding air chuck body to its extended position, such that the pin projecting from the sliding air chuck body slides along the elongated channel and into the axial channel, then stops as it reaches the inside wall of, or near, the outer end of the cap. In order to axially secure the sliding air chuck body in its extended position, the user rotates the sliding air chuck body so as to rotate the pin projecting from the sliding air chuck body within the annular channel to a position out of alignment with the elongated channel.

In order to collapse the sliding air chuck body back to its retracted position, so as to accommodate a Schrader valve, the user again rotates the sliding air chuck body, in either direction, to a position such that the pin is aligned with the elongated channel, then pushes the sliding air chuck body toward the cap until the pin reaches the opposite end of the channel, at which point the sliding air chuck body stops its axial motion. Preferably, a second annular channel is provided in communication with the elongated channel. This second annular channel is also sized to receive the pin, such that the sliding air chuck body may be rotated, thereby rotating the pin out of alignment with the elongated channel, thus axially locking the sliding chuck body in position to accommodate a Schrader valve.

DETAILED DESCRIPTION OF THE PREFERRED EMBODIMENT

Figure 1:
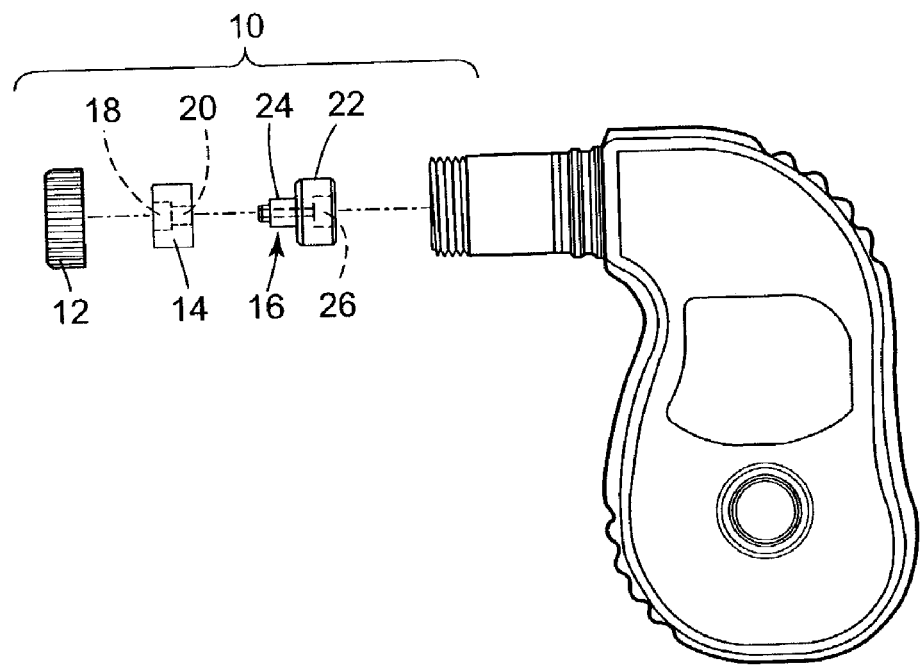
FIG. 1 is a partially exploded front plan view of a conventional air chuck and tire pressure gauge, showing the orientation of the various components of the air chuck as arranged for use with a Shrader valve stem.
Figure 2:
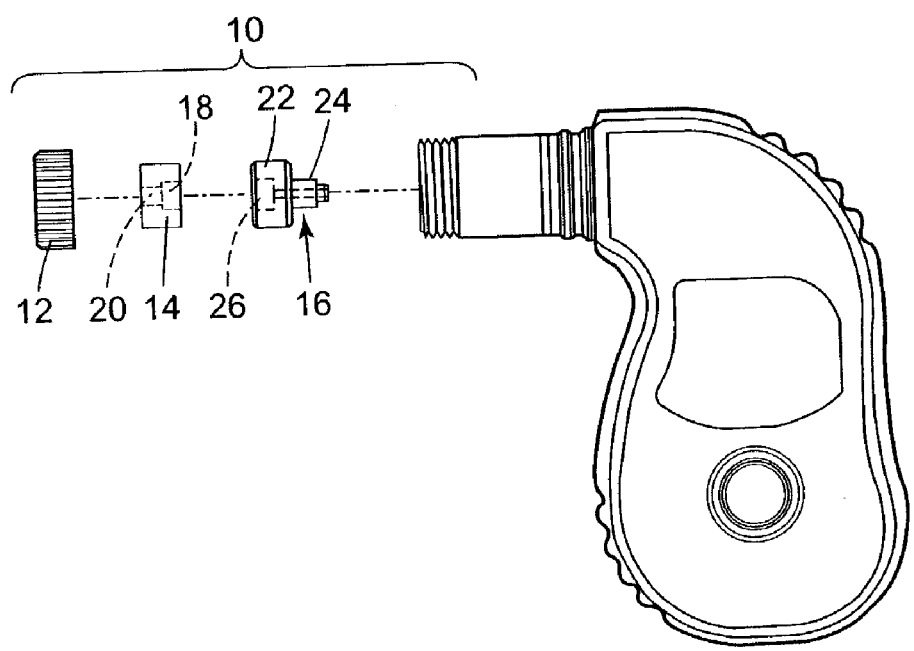
FIG. 2 is a partially exploded front plan view of the conventional air chuck and tire pressure gauge of FIG. 1, showing the orientation of the various components of the air chuck as arranged for use with a Presta valve stem.

As shown in FIGS. 1 and 2, a conventional air chuck 10 that is reconfigurable to accommodate both a Presta valve stem as well as a Schrader valve stem includes an end cap 12, a grommet 14, and a reversible pin 16. The grommet has a relatively large diameter hole 18 and a relatively small diameter hole 20. The reversible pin 16 has a relatively large diameter main body 22, a stepped pin portion 24, a recess 26 within the main body 22, and an air passage 28 extending from the recess 26 through the stepped pin portion 24.

For use with a Schrader valve stem (not shown), the conventional air chuck 10 is configured in the manner shown in FIG. 1, such that the reversible pin 16 is oriented with its stepped pin portion 24 facing outwardly, in the direction of the end cap 12, and the grommet 14 is oriented with its relatively larger diameter hole 18 facing outwardly, in the direction of the end cap 12. The stepped pin portion 24 is received within the relatively small diameter hole 20 in the grommet 14, and the end cap 12 is secured to a threaded portion 30 of a tire pressure gauge 32.

To use the conventional air chuck 10 with a Presta valve stem (not shown), the air chuck 10 is reconfigured in the manner shown in FIG. 2. The reversible pin 16 is oriented such that its stepped pin portion 24 faces inwardly, in the direction away from the end cap 12, and the grommet 14 is oriented with its relatively small diameter hole 20 facing outwardly, in the direction of the end cap 12. The end cap 12 is then secured to the threaded portion 30 of the tire pressure gauge 32.

Turning to FIGS. 3–7, an embodiment of an air chuck 50 is shown. The air chuck 50 is quickly, easily, and reliably repositioned for use with either Presta valve stems or Schrader valve stems. The air chuck 50 includes a chuck housing 52, a sliding chuck body 54, a cap 56, a grommet 58, a chuck pin 60, and a lock pin 62 that projects radially outwardly from the sliding chuck body 54.

The sliding chuck body 54 is seated within the chuck housing 52, with the lock pin 62 received in an elongated channel 64 provided in an inside wall 66 of the chuck housing 52. The width of the elongated channel 64 is preferably just larger than the diameter of the lock pin 62 so as to allow longitudinal movement of the sliding chuck body 54 but prevent rotation of the sliding chuck body 54 while the lock pin 62 is within the elongated channel 64.

A first annular channel 66 is defined by an inside wall 68 of the cap 56 and an outer rim 70 of the chuck housing 52. The annular channel 66 is in communication with the elongated channel 64 at a distal end thereof, such that when the sliding chuck body 54 is extended to the point that the lock pin 62 exits the elongated channel 64, the lock pin 62 enters the annular channel 66 and is prevented from further longitudinal movement by also the inside wall 68 of the cap 56. A second annular channel 67 is preferably provided within the chuck housing 52, in communication with the elongated channel 64.

The chuck pin 60 extends axially through the chuck housing 52, the grommet 58, and through a portion of the sliding chuck body 54. A sealing gasket 72, such as a rubber O-ring, is preferably provided between the sliding chuck body 54 and either the chuck housing 52 or the end cap 56. An annular gasket-receiving channel 73 may be provided in the interior of the cap 56 to receive the sealing gasket 72.

Figure 3:
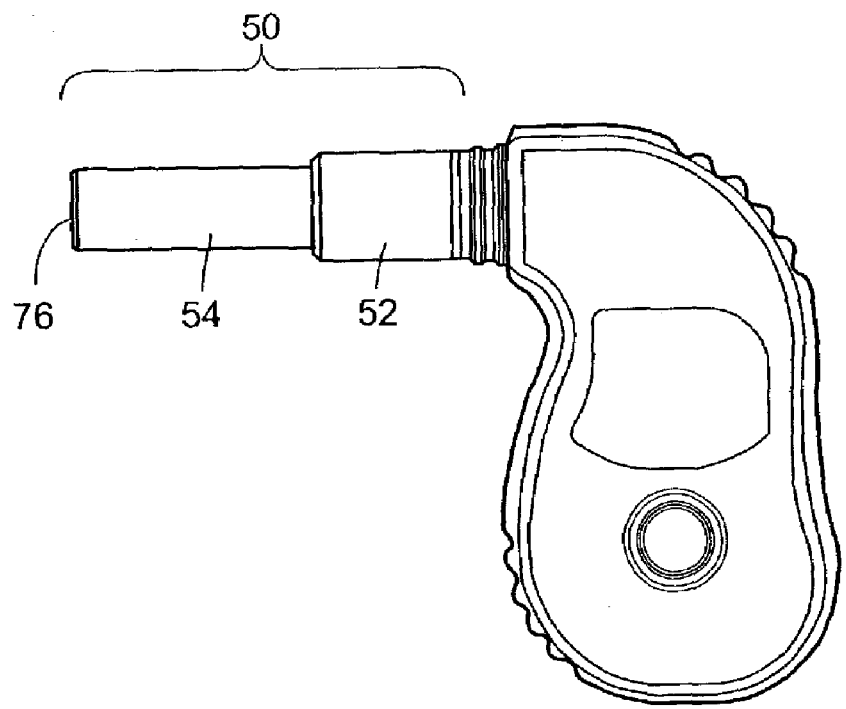
FIG. 3 is a front plan view of an air chuck for a tire pressure gauge adaptable for use with both Presta valve stems and Schrader valve stems, with a sliding chuck body shown in an extended position for use with a Presta valve stem.

To prepare the air chuck 50 for use with a Schrader valve stem (not shown), a user pushes the sliding chuck body 54 inwardly, to a retracted position, as shown in cross-section in FIG. 3, until the lock pin 62 reaches a first end 74 of its travel along the elongated channel 64, and enters the first annular channel 67, thereby preventing further inward axial movement of the sliding chuck body 54. The sliding chuck body 54 is then rotated in order to move the lock pin 62 out of alignment with the elongated channel 67, thus locking the air chuck in a position to accommodate a Schroder valve stem. In this position, the chuck pin 60 is exposed so as to actuate a spring loaded valve core (not shown) of a Schrader valve.

Figure 4:
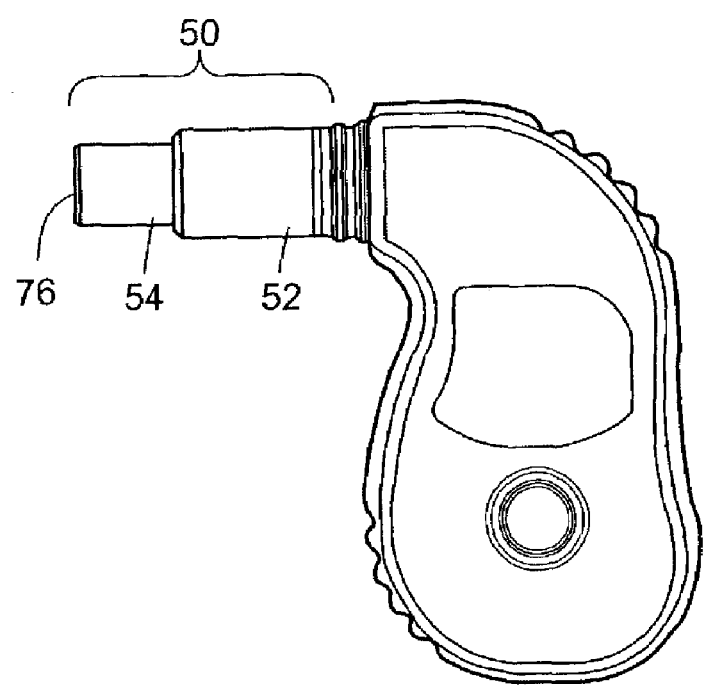
FIG. 4 is a front plan view of the air chuck shown in FIG. 3, with the sliding chuck body shown in the retracted position for use with a Schrader valve stem.
Figure 5:
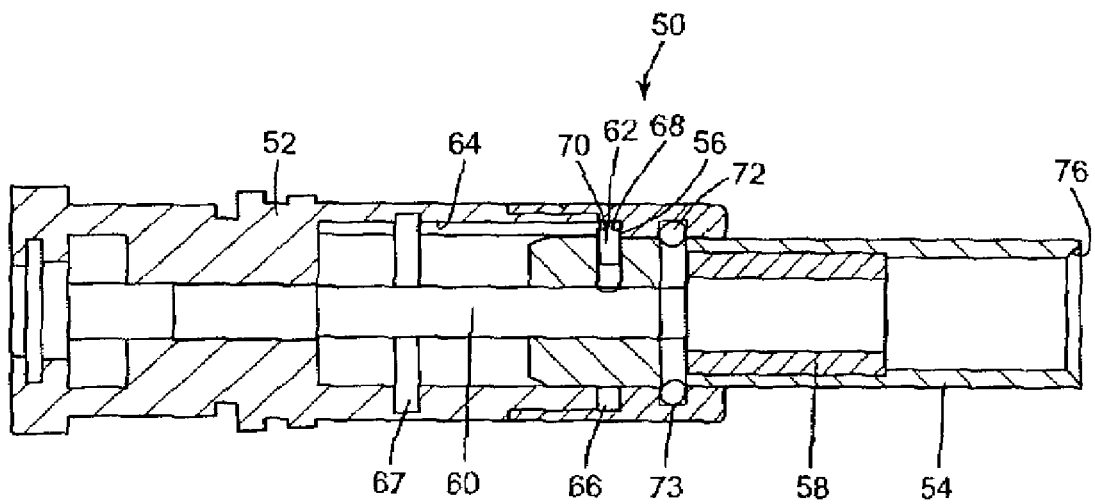
FIG. 5 is a cross-sectional view of the air chuck shown in FIG. 3, with the sliding chuck body shown in an extended position for use with a Presta valve stem.
Figure 6:
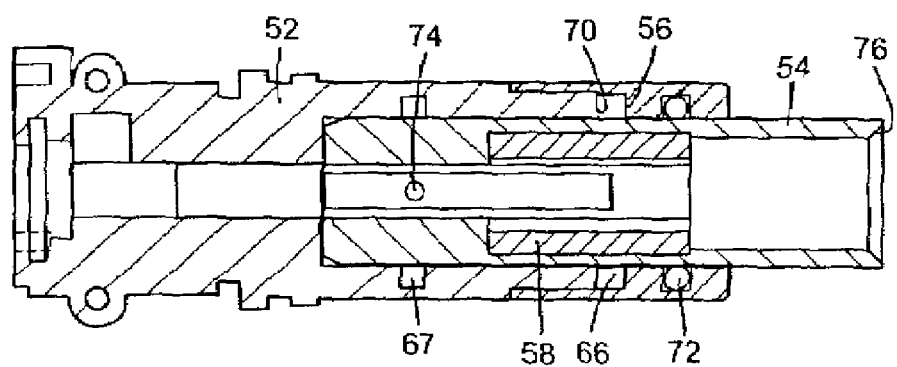
FIG. 6 is a cross-sectional view of the air chuck shown in FIG. 4, with the sliding chuck body shown in the retracted position for use with a Schrader valve stem.
Figure 7:
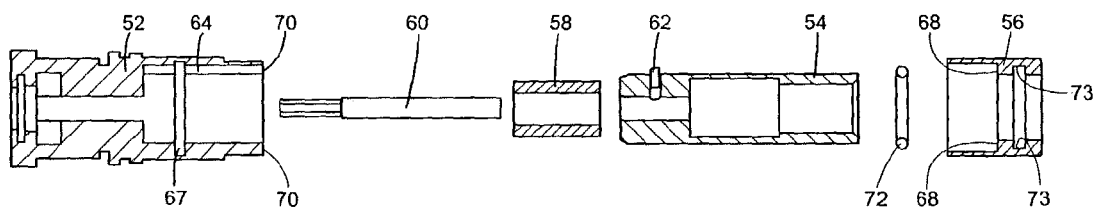
FIG. 7 is an exploded view of the air chuck shown in FIGS. 3 and 4.

When it is desired to use the air chuck 50 with a Presta valve stem (not shown), the user pulls the sliding chuck body 54 to an extended position, as shown in cross-section in FIG. 4. When the lock pin 62 exits the elongated channel 64 and enters the annular channel 66, the inner wall 68 of the end of the cap 56 prevents the sliding chuck body 54 from further longitudinal movement. In this extended position, the end of the chuck pin 60, which remains stationary relative to the chuck housing 52, is spaced a sufficient distance from the exposed rim 76 of the sliding chuck body 54 to allow the insertion of a thin threaded valve stem and floating valve core of a Presta valve (not shown), into the air chuck 50.

In order to secure the sliding chuck body 54 against undesired axial movement while in the extended position, the user rotates the sliding chuck body 54 relative to the chuck housing 52. By doing so, the lock pin 62 is rotated to a position out of alignment with the elongated channel 64, and is secured between the outer rim 70 of the chuck housing 52 and the inner wall 68 of the end of the cap 56. Preferably, the annular channel 66 extends about the circumference of the sliding chuck body 54, but it is recognized that the annular channel 66 may extend only partially about the sliding chuck body 54, for example half-way, so long as there is sufficient room within the annular channel 66 to move the lock pin 62 to a position outside of alignment with the elongated channel 64. Likewise, the annular channel 67 preferably extends about the circumference of the sliding chuck body 54, but may extend only partially about the sliding chuck body 54.

While the air chuck 50 disclosed is particularly suitable for use with a tire pressure gauge, such as the tire pressure gauge 32 shown in FIGS. 1 and 2, it is recognized that the air chuck 50 could be employed in other devices where it may be desirable to provide an air chuck capable of accommodating both Presta valve stems and Schrader valve stems, such as at the end of an air pump. While a certain preferred embodiment has been disclosed, it is also recognized that variations may be made thereto without departing from the scope of the appended claims.

I claim:

1. An air chuck for use with two different types of valve stems, comprising:
   (a) a chuck housing having an elongated channel therein;
   (b) a sliding chuck body, at least a portion of which is received in the chuck housing;
   (c) a chuck pin axially aligned with the chuck housing and the sliding chuck body;
   (d) a lock pin projecting radially outwardly of the sliding chuck body and selectively received in the elongated channel of the chuck housing, whereby the sliding chuck body is movable between a retracted position and an extended position;
   (e) a cap secured to the chuck housing; and
   (f) an annular channel in communication with the elongated channel and receiving the lock pin when the sliding chuck body is moved to one of the extended or retracted position, and said sliding chuck body being rotatable relative to the chuck housing when the lock pin is received in the annular channel, whereby the sliding chuck body is securable against axial movement relative to the chuck housing by rotation of the lock pin within the annular channel to a position outside of alignment with the elongated channel.

2. The air chuck of claim 1, wherein the annular channel is defined between the chuck housing and the cap.

3. An air chuck for use with two different types of valve stems, comprising:
   (a) a chuck housing having an elongated channel therein;
   (b) a sliding chuck body, at least a portion of which is received in the chuck housing;
   (c) a chuck pin axially aligned with the chuck housing and the sliding chuck body;
   (d) a lock pin projecting radially outwardly of the sliding chuck body and selectively received in the elongated channel of the chuck housing, whereby the sliding chuck body is movable between a retracted position and an extended position; and
   (e) two annular channels in communication with the elongated channel, each of the annular channels adapted to receive the lock pin, one of the annular channels receiving the lock pin when the sliding chuck body is in the retracted position and the other of said annular channels receiving the lock pin when the sliding chuck body is in the extended position and said sliding chuck body being rotatable relative to the chuck housing when the lock pin is received in either of the annular channels, whereby the sliding chuck body is securable against axial movement relative to the chuck housing by rotation of the lock pin within either of the annular channels to a position outside of alignment with the elongated channel.

4. An air chuck for use with at least two types of valve stems, comprising:
   a chuck housing;
   a chuck pin in axial alignment with, and received within, the chuck housing;
   a sliding chuck body slidable within the chuck housing; said sliding chuck body slidable between a first retracted position wherein said chuck pin is exposed for engagement with a first type of valve stem, and a second extended position wherein said chuck pin is spaced from an exposed rim of the sliding chuck body to permit insertion of a second type of valve stem within the air chuck;
   a lock pin extending radially outwardly from the sliding chuck body, and wherein at least one elongated channel is provided within the chuck housing, said elongated channel being sized to receive the lock pin;
   a cap secured to the chuck housing; and
   an annular channel provided between an inside wall of an end of the cap and a rim of the chuck housing, said annular channel being sized to receive the lock pin and being in communication with the elongated channel, whereby the inside wall prevents movement of the sliding chuck body beyond its extended position and the sliding chuck body is securable against axial movement relative to the chuck housing by rotation of the lock pin within the annular channel to a position outside of alignment with the elongated channel.

\* \* \* \* \*